(12) United States Patent
Kinoshita et al.

(10) Patent No.: US 9,696,167 B2
(45) Date of Patent: Jul. 4, 2017

(54) RECOMMENDED-DRIVE-PATTERN GENERATION DEVICE AND RECOMMENDED-DRIVE-PATTERN GENERATION METHOD

(75) Inventors: Ryusuke Kinoshita, Tokyo (JP); Takashi Irie, Tokyo (JP); Masahiko Ikawa, Tokyo (JP); Yuko Ohta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 128 days.

(21) Appl. No.: 14/407,023

(22) PCT Filed: Jun. 27, 2012

(86) PCT No.: PCT/JP2012/066345
§ 371 (c)(1),
(2), (4) Date: Dec. 10, 2014

(87) PCT Pub. No.: WO2014/002209
PCT Pub. Date: Jan. 3, 2014

(65) Prior Publication Data
US 2015/0185028 A1  Jul. 2, 2015

(51) Int. Cl.
*B60W 40/09* (2012.01)
*G01C 21/34* (2006.01)
(Continued)

(52) U.S. Cl.
CPC ............. *G01C 21/34* (2013.01); *B60W 40/02* (2013.01); *B60W 40/09* (2013.01);
(Continued)

(58) Field of Classification Search
None
See application file for complete search history.

(56) References Cited

U.S. PATENT DOCUMENTS 5,428,544 A * 6/1995 Shyu .................. G01C 21/3492
701/117
5,594,413 A 1/1997 Cho et al.
(Continued)

FOREIGN PATENT DOCUMENTS

CN 1291567 A 4/2001
CN 102473347 A 5/2012
(Continued)

OTHER PUBLICATIONS

International Search Report, mailed Sep. 11, 2012, issued in PCT/JP2012/066345.
(Continued)

*Primary Examiner* — John R Olszewski
*Assistant Examiner* — David Merlino
(74) *Attorney, Agent, or Firm* — Birch, Stewart, Kolasch & Birch, LLP

(57) ABSTRACT

An object of the present invention is to provide a recommended-drive-pattern generation device that generates a recommended drive pattern with low energy consumption in consideration of actual drive of the user. A recommended-drive-pattern generation device of the present invention includes: a reference drive pattern generating unit that generates as a reference drive pattern a drive pattern in a past drive route from a drive history of a moving body; a speed limit point setting unit that sets a speed limit point within the drive route based on at least one of the reference drive pattern and road information of the drive route; and a recommended-drive-pattern generating unit that generates a recommended drive pattern for the drive route in which the speed limit point is passed at a speed not higher than a speed limit defined by the speed limit point.

16 Claims, 5 Drawing Sheets

(51) Int. Cl.
*B60W 40/02* (2006.01)
*G08G 1/01* (2006.01)

(52) U.S. Cl.
CPC ....... *G01C 21/3484* (2013.01); *G08G 1/0112* (2013.01); *G08G 1/0129* (2013.01); *G08G 1/0145* (2013.01); *B60W 2530/14* (2013.01)

(56) References Cited

U.S. PATENT DOCUMENTS

| | | | |
|---|---|---|---|
| 6,314,347 B1* | 11/2001 | Kuroda | G01C 21/26 701/22 |
| 6,442,453 B1 | 8/2002 | Fukuoka | |
| 8,306,725 B2* | 11/2012 | Son | G08G 1/052 701/117 |
| 8,374,740 B2 | 2/2013 | Druenert et al. | |
| 8,457,892 B2 | 6/2013 | Aso et al. | |
| 9,183,740 B2 | 11/2015 | Ota et al. | |
| 2009/0012703 A1 | 1/2009 | Aso et al. | |
| 2012/0109510 A1* | 5/2012 | Ota | G01C 21/3469 701/400 |
| 2013/0013164 A1 | 1/2013 | Taguchi | |
| 2013/0245866 A1* | 9/2013 | Kuretake | B60W 20/00 701/22 |
| 2014/0088849 A1* | 3/2014 | Ham | B60W 30/143 701/70 |

FOREIGN PATENT DOCUMENTS

| | | |
|---|---|---|
| CN | 102509470 A | 6/2012 |
| DE | 10 2011 018 182 A1 | 12/2011 |
| WO | WO 2007/102405 A1 | 9/2007 |
| WO | WO 2011/036855 A1 | 3/2011 |
| WO | WO 2011/101949 A1 | 8/2011 |

OTHER PUBLICATIONS

Office Action issued Oct. 11, 2016 in corresponding German Application No. 11 2012 006 594.8 with an English Translation.

* cited by examiner

F I G. 1
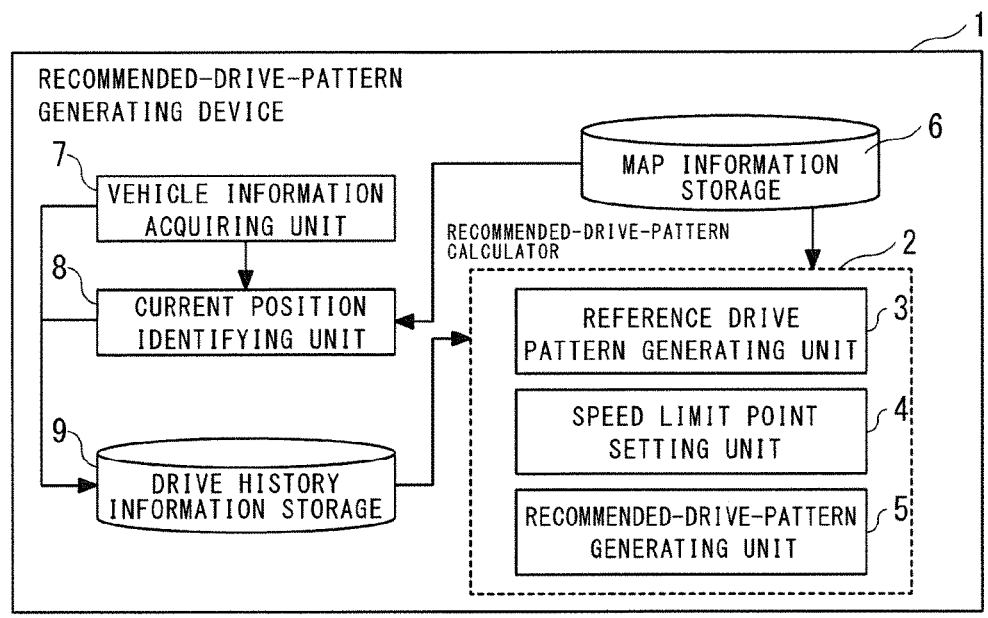

(a)

(b)

(c)

(a)

(b)

RECOMMENDED-DRIVE-PATTERN GENERATION DEVICE AND RECOMMENDED-DRIVE-PATTERN GENERATION METHOD

TECHNICAL FIELD

The present invention relates to a recommended-drive-pattern generation device that generates a recommended drive pattern which is recommended from a viewpoint of energy-saving performance with respect to a past drive route of a moving body.

BACKGROUND ART

A drive pattern generation device that generates a drive pattern (recommended drive pattern), which makes energy consumption during drive of a vehicle as low as possible, is disclosed in Patent Document 1, for example. This technique is to generate a drive pattern (reference drive pattern) in the case of driving without considering energy consumption, divide the reference drive pattern into a plurality of drive sections, and generate a low fuel consumption drive pattern (recommended drive pattern) so as to minimize acceleration in each drive section at a speed not higher than a set upper-limit speed without greatly changing drive time in each of the divided drive sections from the drive time of the reference drive pattern.

PRIOR ART DOCUMENT

Patent Document

Patent Document 1: WO2011/036855 A1

SUMMARY OF INVENTION

Problems to be Solved by the Invention

In the recommended-drive-pattern generating method of Patent Document 1, the drive time is specified with respect to each drive section of the reference drive pattern. For this reason, acceleration/deceleration may become unnaturally large in order to meet conditions of the upper-limit speed and the drive time, depending on the reference drive pattern. As a result, there has been a problem of generating such a recommended drive pattern in which the user cannot actually drive.

In view of the foregoing problem, an object of the present invention is to provide a recommended-drive-pattern generation device that generates a recommended drive pattern in consideration of actual drive of the user.

Means for Solving the Problems

A recommended-drive-pattern generation device of the present invention includes: a reference drive pattern generating unit that generates as a reference drive pattern a drive pattern in a past drive route from a drive history of a moving body; a speed limit point setting unit that sets a speed limit point within the drive route based on at least one of the reference drive pattern and road information of the drive route; and a recommended-drive-pattern generating unit that generates a recommended drive pattern for the drive route in which the speed limit point is passed at a speed not higher than a speed limit defined by the speed limit point and a passage time at the speed limit point is the same as or later than a passage time of the reference drive pattern.

A recommended-drive-pattern generation method of the present invention includes the steps of: generating as a reference drive pattern a drive pattern in a past drive route from a drive history of a moving body; setting a speed limit point within the drive route based on at least one of the reference drive pattern and road information of the drive route; and generating a recommended drive pattern for the drive route in which the speed limit point is passed at a speed not higher than a speed limit defined by the speed limit point and a passage time at the speed limit point is the same as or later than a passage time of the reference drive pattern.

Effects of the Invention

A recommended-drive-pattern generation device of the present invention includes: a reference drive pattern generating unit that generates as a reference drive pattern a drive pattern in a past drive route from a drive history of a moving body; a speed limit point setting unit that sets a speed limit point within the drive route based on at least one of the reference drive pattern and road information of the drive route; and a recommended-drive-pattern generating unit that generates a recommended drive pattern for the drive route in which the speed limit point is passed at a speed not higher than a speed limit defined by the speed limit point and a passage time at the speed limit point is the same as or later than a passage time of the reference drive pattern, whereby it is possible to generate a recommended drive pattern in consideration of actual drive of the user.

A recommended-drive-pattern generation method of the present invention includes the steps of: generating as a reference drive pattern a drive pattern in a past drive route from a drive history of a moving body; setting a speed limit point within the drive route based on at least one of the reference drive pattern and road information of the drive route; and generating a recommended drive pattern for the drive route in which the speed limit point is passed at a speed not higher than a speed limit defined by the speed limit point and a passage time at the speed limit point is the same as or later than a passage time of the reference drive pattern, whereby it is possible to generate a recommended drive pattern in consideration of actual drive of the user.

An object, characteristics, aspects and advantages of the present invention will become more apparent by the following detailed descriptions and attached drawings.

BRIEF DESCRIPTION OF DRAWINGS

FIG. 1 is a block diagram showing a configuration of a recommended-drive-pattern generation device according to a first embodiment.

DESCRIPTION OF EMBODIMENTS

A. First Embodiment

Figure 2:
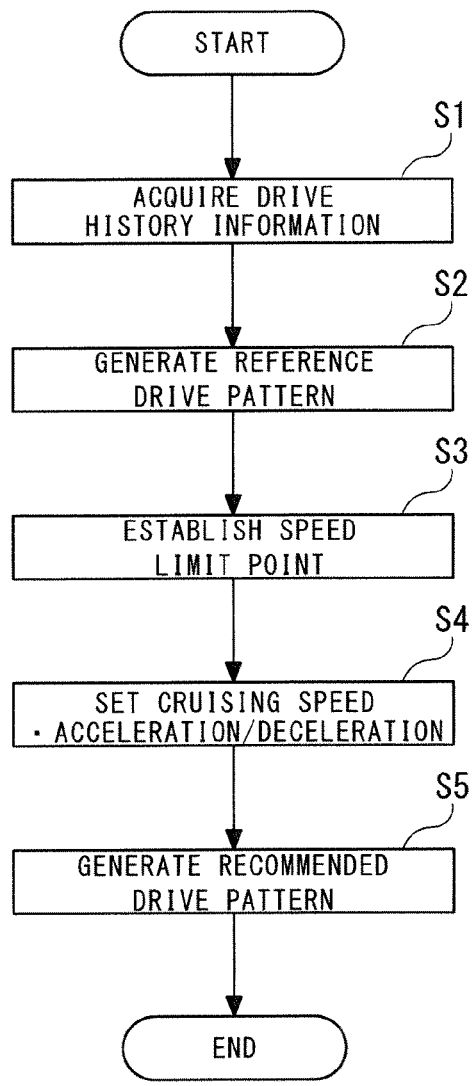
FIG. 2 is a flowchart showing an operation of the recommended-drive-pattern generation device according to the first embodiment.

A recommended-drive-pattern generation device according to a first embodiment is mounted in a navigation apparatus mounted in a moving body such as a vehicle, for example. This recommended-drive-pattern generation device calculates a recommended drive pattern in consideration of actual drive of the user by taking into account a traffic state during drive and drive time with respect to a drive section in which the vehicle drived in the past.

A-1. Configuration

FIG. 1 is a block diagram showing a configuration of a recommended-drive-pattern generation device 1 according to a first embodiment. The recommended-drive-pattern generation device 1 is provided with a recommended-drive-pattern calculator 2, a map information storage 6, a vehicle information acquiring unit 7, a current position identifying unit 8, and a drive history information storage 9.

The map information storage 6 is means that stores and manages map information. In the map information, a road network is expressed by nodes and a road link connecting a plurality of nodes, for example. The road link has a road type, a road length, speed limit information, slope information or curve information, as an attribute. Hereinafter, these information that the road link has are referred to as road link information (road information).

The vehicle information acquiring unit 7 acquires a speed, acceleration and the like through use of a variety of sensors including a gyro scope, as information (vehicle information) of a vehicle equipped with the recommended-drive-pattern generation device. The acquired vehicle information is outputted to the drive history information storage 9. The vehicle information acquiring unit 7 continuously executes acquirement and output of vehicle information to the drive history information storage 9 at predetermined timing.

The current position identifying unit 8 acquires a current position from a GPS, and maps this with the map information acquired from the map information storage 6, thereby to identify which position on the road link one's own vehicle is present at. The identified position information of one's own vehicle is referred to as own vehicle position information. It is to be noted that identification of the current position may be supported by use of the vehicle information acquired from the vehicle information acquiring unit 7. The own vehicle position information is outputted to the drive history information storage 9 along with a road link ID linked by mapping processing. Here, it is assumed that the road link ID is information capable of uniquely specifying the road link out of the map information managed in the map information storage 6. The current position identifying unit 8 continuously executes identification of the current position and output of the own vehicle position information to the drive history information storage 9 at predetermined timing.

The drive history information storage 9 saves and stores the vehicle information, the own vehicle position information and the road link ID acquired from the vehicle information acquiring unit 7 and the current position identifying unit 8, in association with time information. Further, the drive history information storage 9 outputs the saved information in response to a request from the recommended-drive-pattern calculator 2. Although the road link ID is to be saved here, the road link information may be saved in place of the road link ID. Further, both the road link ID and the road link information can be made to be saved. In these cases, the recommended-drive-pattern calculator 2 need not acquire the map information from the map information storage 6 in generation of a later-mentioned recommended drive pattern.

The recommended-drive-pattern calculator 2 generates a recommended drive pattern with lower energy consumption in consideration of actual drive of the user, based on the drive history information acquired from the drive history information storage 9. The recommended-drive-pattern calculator 2 is provided with a reference drive pattern generating unit 3, a speed limit point setting unit 4 and a recommended-drive-pattern generating unit 5.

The reference drive pattern generating unit 3 specifies a range and acquires drive history information from the drive history information storage 9, and sets a reference drive pattern based on this. The reference drive pattern means a drive pattern in which one's own vehicle drived in the past, and is expressed as an array of own vehicle position information, a drive time and a vehicle speed.

The speed limit point setting unit 4 acquires road link information from the map information storage 6 based on a road link ID acquired from the drive history information storage 9. Then, based on at least one of the road link information and the reference drive pattern, the speed limit point setting unit 4 sets a speed limit point that defines a speed limit. It is to be noted that when the speed limit point is to be set by use of only the reference drive pattern, it may be configured so as not to acquire road link information. The speed limit point has position information and speed information, and it may further have passage time information that defines a passage time.

The recommended-drive-pattern generating unit 5 calculates a recommended drive pattern with lower energy consumption with respect to the same drive route as that of the reference drive pattern, based on the reference drive pattern, the speed limit point and the road link information.

A-2. Operation

FIG. 2 is a flowchart showing recommended-drive-pattern calculation processing of the recommended-drive-pattern calculator 2. The recommended-drive-pattern calculation processing is performed with respect to a predetermined drive section at predetermined timing. For example, it is performed with respect to a drive section in each drive at a predetermined distance or for predetermined time. Alternatively, it is performed, at each stop, with respect to a drive section from a previous stop position. Alternatively, it is performed with respect to a drive section from a departure place to a destination at the point of arrival at the destination in accordance with a guidance by use of the map information.

In the recommended-drive-pattern calculation processing, first, the reference drive pattern generating unit 3 acquires drive history information in a specified range from the drive history information storage 9 (Step S1). Here, the reference drive pattern generating unit 3 acquires drive history information of a section for generating a recommended drive pattern. The acquired drive history information includes a drive time, a vehicle speed, vehicle acceleration, a road link ID and own vehicle position information.

Next, the reference drive pattern generating unit 3 generates a reference drive pattern based on the drive history information acquired from the drive history information storage 9 in Step S1 (Step S2). The reference drive pattern is expressed as an array of the own vehicle position information, the drive time and the vehicle speed.

Next, the speed limit point setting unit 4 sets a speed limit point by use of at least one of the reference drive pattern and the road link information of the drive route (Step S3). The road link information used here is acquired from the map information storage 6 as necessary by using the road link ID of the drive history information acquired in Step S1 as a key. The speed limit point is established at a point where the speed decreases in the reference drive pattern or a point where the speed may decrease, and the speed limit point includes established-position information showing an established position on the drive route and speed limit information showing a maximum value of a passage speed at the speed limit point which is permitted by the recommended drive pattern. When the speed limit point is set by use of the reference drive pattern, a passage speed at the speed limit point in accordance with the reference drive pattern is set as a speed limit. Additionally, the speed limit point may have passage time information showing the earliest passage time at the speed limit point permitted by the recommended drive pattern. Basically, the passage time at the speed limit point in accordance with the reference drive pattern is set as the passage time information. However, at a speed limit point with a speed limit of 0, a time at which the speed starts to increase after a stop at the speed limit point is defined as the passage time.

Examples (1) to (5) of conditions for establishing the speed limit point are shown below: (1) The speed limit point with a speed limit of 0 is established at a temporary stop point, namely a point with a speed of 0 except for a start and a terminal of the reference drive pattern. (2) The speed limit point is established at a point of right/left turn at a crossing. As a set speed, a predetermined value may be set other than a passage speed at the point of right/left turn in the reference drive pattern. (3) The speed limit point is established in a sharp curve with a turn and a curvature radius being smaller than thresholds. As the set speed, a predetermined value according to the curvature radius may be set other than the passage speed in accordance with the reference drive pattern. (4) In the reference drive pattern, the speed limit point is established at a point where the speed becomes lower than a threshold. It is estimated that at such a point, the speed could not help decreasing to a fixed speed or lower because a traffic volume was large and a distance between cars decreased. The threshold for the speed may be set uniformly, or may be set with respect to each of the road type and the speed limit for the road. It is to be noted that in the case where the speed decreases, and then stops, establishment of the speed limit point may be avoided. (5) The speed limit point may be established at a point where a signal, a toll gate or a railroad crossing exists. The settings in (1) to (4) above can be made by use of the reference drive pattern. Further, the settings in (2), (3) and (5) above can be made by use of the road link information.

Figure 3:
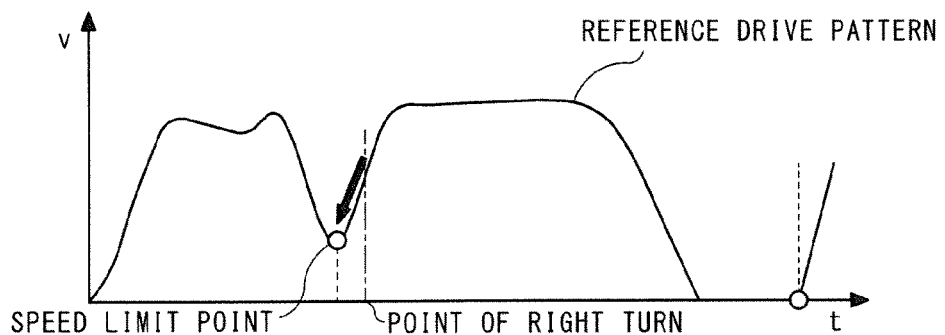
FIG. 3 is a diagram showing an example of adjusting a speed limit point.

A position of one among the speed limit points, which is set by use of the map information, may be adjusted to a point which is before or after that point and at which the speed of the reference drive pattern becomes minimal. FIG. 3 shows an example of adjusting the position of the speed limit point. A solid line indicates the reference drive pattern, and a dashed line indicates a time for right turn at the crossing. Normally, the vehicle decelerates when approaching the point of right turn. However, as the speed becomes minimal before the point of right turn in the reference drive pattern of FIG. 3, the minimal point of the speed does not often agree exactly with the point of right turn on the map. Therefore, by moving the speed limit point to the minimal point of the speed in the reference drive pattern, it becomes possible to generate the recommended-drive pattern easier for actual drive.

Returning to the flowchart of FIG. 2, next, the recommended-drive-pattern generating unit 5 sets a cruising speed and acceleration/deceleration of the recommended drive pattern with respect to each section (hereinafter, simply referred to as section) of the drive route divided by the speed limit point generated in Step S3 (Step S4). This cruising speed shows a speed of a constant speed portion of the section.

As the cruising speed, the speed limit of the road link to drive on may be used. Further, the cruising speed may be set based on a variety of road link information such as a road width, average drive time and a road type such as the number of lanes. Moreover, the speed of the reference drive pattern with the largest drive frequency within the section may be used.

Figure 4:
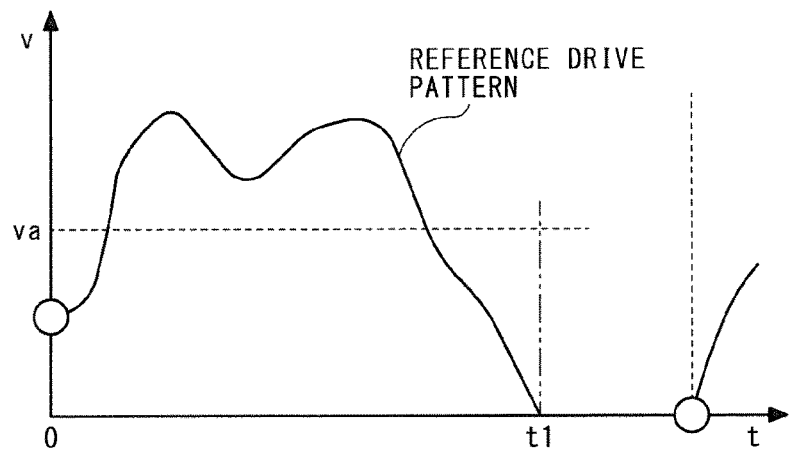
FIG. 4 is a diagram showing an example of setting a cruising speed by use of a reference drive pattern.
Figure 4:
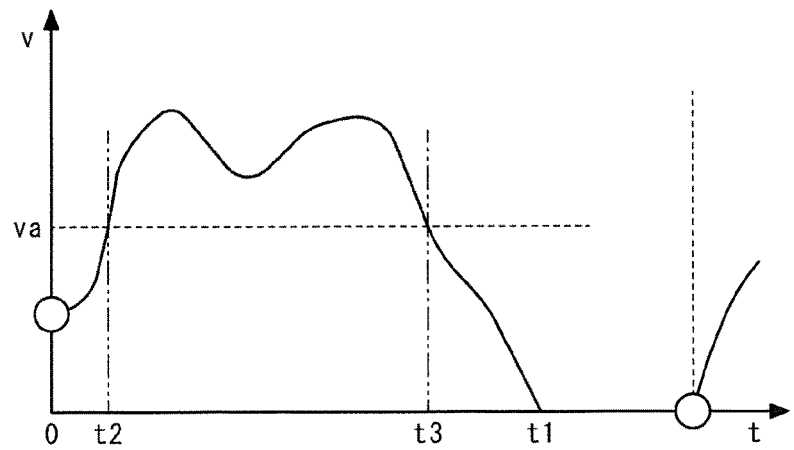
Figure 4:
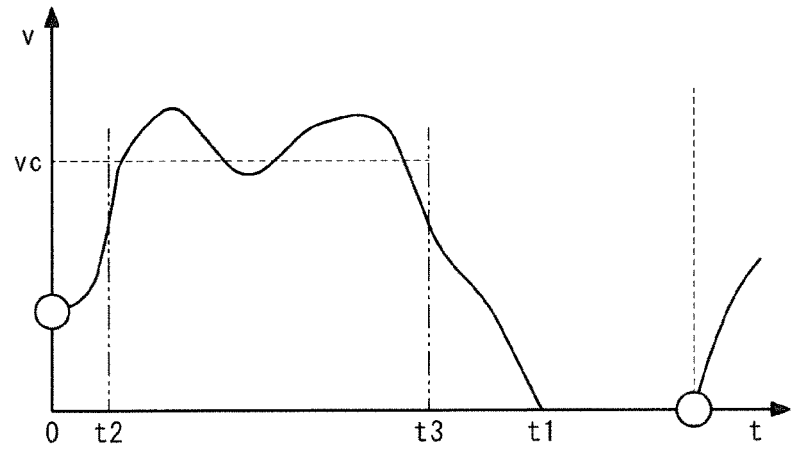

Furthermore, a pseudo-cruising speed may be obtained from the reference drive pattern by a method shown in FIG. 4, and this may be used. That is, there is obtained an average drive speed va in a range of a drive speed v>0 (from time t=0 to t=t1) with respect to a certain drive section of the reference drive pattern (part (a) of FIG. 4). Next, a range of the drive speed v>va (from time t=t2 to t=t3) is extracted (part (b) of FIG. 4). Finally, an average drive speed in the extracted section is obtained, and this is taken as a cruising speed vc (part (c) of FIG. 4).

As the acceleration/deceleration, there may be used a fixed value that is set uniformly in each section. As the fixed value, there may be set acceleration/deceleration with which the energy consumption efficiency is generally considered as good, or there may be set efficient acceleration/deceleration in line with characteristics of the driving vehicle.

Figure 5:
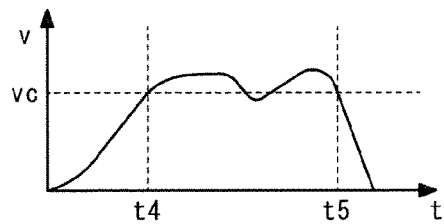
FIG. 5 is a diagram showing an example of setting acceleration by use of the reference drive pattern.
Figure 5:
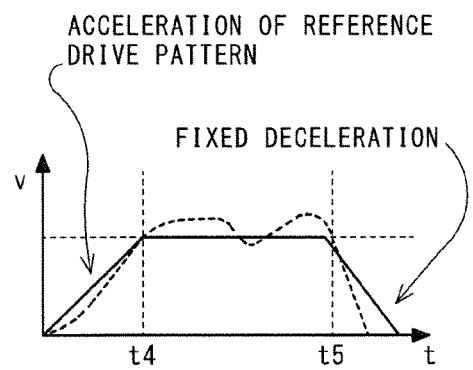

Alternatively, there may be set acceleration/deceleration with reference to the reference drive pattern as shown in FIG. 5. In the reference drive pattern, acceleration is obtained from the time from a starting speed until reaching the cruising speed vc, and deceleration is obtained from the time from the cruising speed vc until reaching a terminal speed. The calculated acceleration/deceleration may be set as they are as acceleration/deceleration of the recommended drive pattern, or the calculated acceleration/deceleration may be compared with the foregoing fixed value that is set uniformly in each section, and the smaller value may be adopted. Part (b) of FIG. 5 shows a case where the acceleration obtained from the reference drive pattern is adopted as the acceleration, and a fixed value (fixed deceleration) smaller than the acceleration obtained from the reference drive pattern is adopted as the deceleration. This can generate a recommended drive pattern with lower energy consumption.

Further, the acceleration/deceleration may be set in line with characteristics of the drive route. For example, with reference to slope information of the road link, acceleration/deceleration in line with a slope of the section is used. For example, when the section is a down-slope, there is set acceleration with which the speed can be increased through use of gravitational acceleration without pressing an accelerator.

Returning to the flowchart of FIG. 2, the recommended-drive-pattern generating unit 5 generates a recommended drive pattern by use of the speed limit point obtained in Step S3 and the cruising speed and the acceleration/deceleration obtained in Step S4 (Step S5). In each section, the recommended drive pattern shifts from the starting speed to the cruising speed with the acceleration set in Step S4, and after driving at the cruising speed, the recommended drive pattern shifts to the terminal speed with the set deceleration. At this time, the cruising speed and the acceleration are adjusted so as to make the terminal speed not higher than the speed limit of the speed limit point on the section border.

Figure 6:
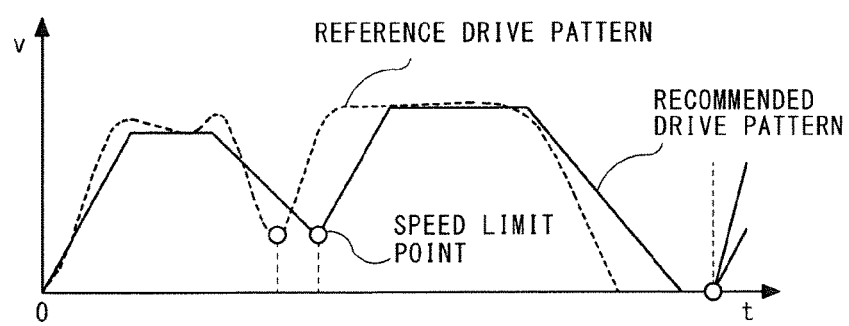
FIG. 6 is a diagram showing a reference drive pattern and a recommended drive pattern.

FIG. 6 shows an example of the reference drive pattern (dotted line) and the recommended drive pattern (solid line). A vertical axis of the diagram indicates a speed v, and a horizontal axis thereof indicates time t. The recommended-drive-pattern generating unit generates a recommended drive pattern such that in each section an area surrounded by the horizontal axis and the graph in the case of the recommended drive pattern is the same as in the case of the reference drive pattern. Further, when the speed limit point has passage time information, adjustment such as lowering of the cruising speed is performed such that a passage time at the speed limit point of the recommended drive pattern becomes not earlier than a passage time defined by the speed limit point.

Figure 7:
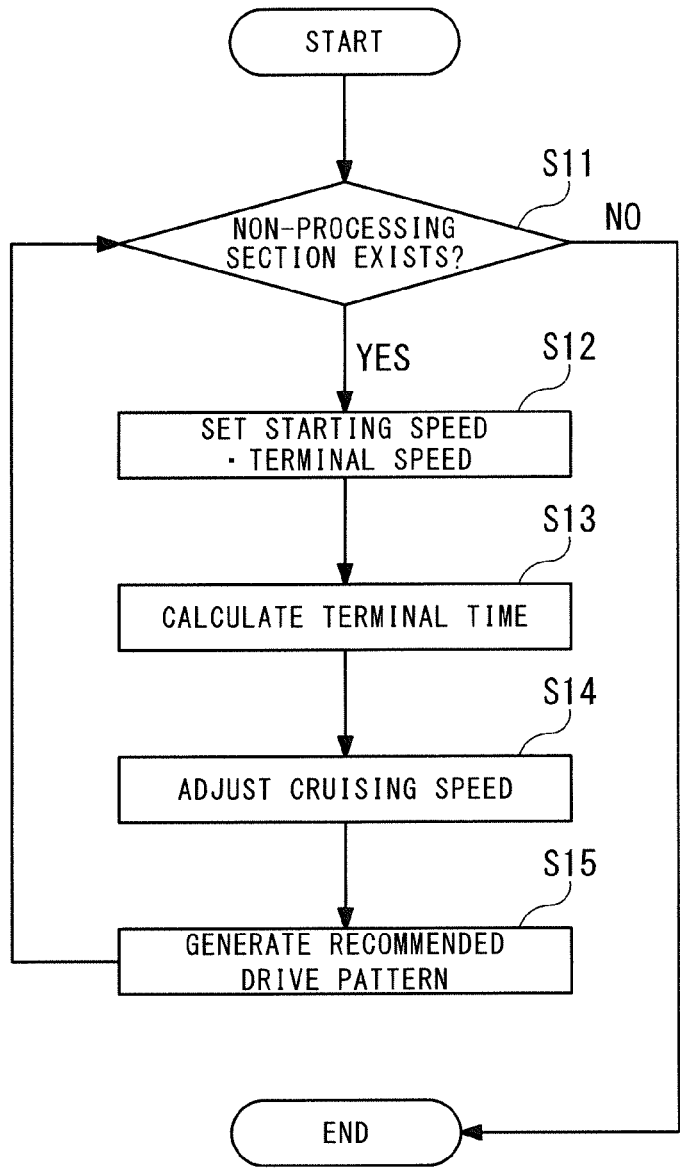
FIG. 7 is a flowchart showing recommended-drive-pattern generation processing.

FIG. 7 shows a flowchart of the recommended-drive-pattern generation processing in the recommended-drive-pattern generating unit 5 (Step S5 of FIG. 2). It is determined whether or not non-processing section exists (Step S11), and when it exists (YES in Step S11), the recommended-drive-pattern generation processing in Step S12 and thereafter is executed from the front section of the drive route.

First, a starting speed and a terminal speed are set (Step S12). As the starting speed, the starting speed of the reference drive pattern is used in the case of the first section, and the terminal speed of the previous section is used from the next section. As the terminal speed, a median value between the cruising speed in the current section and the cruising speed in the next section is compared with the set speed of the speed limit point, and the lower speed value is used.

Next, a terminal time in the section is calculated (Step S13). From the distance of the section, the cruising speed and the acceleration/deceleration set in Step S4 of FIG. 2 and the starting speed and the terminal speed set in Step S12, section drive time of the recommended drive pattern is obtained, and the terminal time is then obtained.

Next Step S14 is processing in a case where the passage time has been set at the speed limit point. Here, the section terminal time obtained in Step S13 is compared with the passage time at the speed limit point as the same point in accordance with the reference drive pattern. When the section terminal time is earlier than the passage time of the reference drive pattern, the cruising speed is decreased, thereby adjusting the section terminal time of the recommended drive pattern so as to be the same as or later than the passage time of the reference drive pattern.

Finally, using the starting speed, the acceleration, the cruising speed and the deceleration, the recommended drive pattern is generated with respect to one section (Step S15). The processing of Steps S12 to S15 are sequentially executed from the front section of the drive route, and at the time when the non-processing section no longer exists (No in Step S11), the processing is completed.

A-3. Effect

The recommended-drive-pattern generation device of the present invention includes: the reference drive pattern generating unit 3 that generates as a reference drive pattern a drive pattern in a past drive route from a drive history of a moving body; the speed limit point setting unit 4 that sets a speed limit point within the drive route based on at least one of the reference drive pattern and road link information of the drive route; and the recommended-drive-pattern generating unit 5 that generates a recommended drive pattern for the drive route in which the speed limit point is passed at a speed not higher than a speed limit defined by the speed limit point. By setting a speed limit point for limiting the speed of the recommended drive pattern on the drive route, it is possible to generate the recommended drive pattern in consideration of deceleration due to a right/left turn, a sharp curve, a traffic jam or the like and in consideration of actual drive of the user.

Further, by setting the passage speed at the speed limit point in accordance with the reference drive pattern to the speed limit of the speed limit point, it is possible to generate the recommended drive pattern in consideration of actual drive of the user.

Moreover, since the recommended-drive-pattern generating unit 5 sets the cruising speed of the recommended drive pattern based on the reference drive pattern in each section of the drive route divided by the speed limit point, it is possible to generate the recommended drive pattern in consideration of a traffic state during history drive.

Alternatively, since the recommended-drive-pattern generating unit 5 sets the cruising speed of the recommended drive pattern based on the road link information of the drive route in each section of the drive route divided by the speed limit point, it is possible to generate the recommended drive pattern in consideration of actual drive of the user according to the road.

Moreover, the recommended-drive-pattern generating unit 5 generates the recommended drive pattern such that the passage time at the speed limit point in accordance with the recommended drive pattern becomes later than that in accordance with the reference drive pattern. Accordingly, an average speed becomes lower as compared to that of the reference drive pattern, to give the recommended drive pattern in consideration of actual drive of the user.

Furthermore, since the recommended-drive-pattern generating unit 5 sets the acceleration/deceleration of the recommended drive pattern based on the reference drive pattern in each section of the drive route divided by the speed limit point, it is possible to generate the recommended drive pattern with low energy consumption.

Alternatively, since the recommended-drive-pattern generating unit 5 sets the acceleration/deceleration of the recommended drive pattern based on the slope of the drive route in each section of the drive route divided by the speed limit point, on a down-slope, for example, acceleration is set with which the speed can be increased without pressing an accelerator, whereby it is possible to generate the recommended drive pattern with low energy consumption.

Furthermore, since the recommended-drive-pattern generating unit 5 sets the acceleration/deceleration of the recommended drive pattern with a predetermined fixed value in each section of the drive route divided by the speed limit point, by setting a value with which the energy consumption efficiency is generally considered as good or setting a value with good energy consumption efficiency in line with characteristics of the driving vehicle, it is possible to generate the recommended drive pattern with low energy consumption.

It is to be noted that, although the example has been shown in the first embodiment where the recommended-drive-pattern generation device is mounted in the navigation apparatus equipped in the moving body such as the vehicle, this is not restrictive. For example, the recommended-drive-pattern generation device may be mounted in the moving body itself, such as a vehicle. Further, it may be mounted in a mobile terminal such as a smart phone or a tablet terminal. Furthermore, the recommended-drive-pattern generation device may be mounted in a server provided outside the moving body. In this case, it can be configured such that a result generated by the recommended-drive-pattern generation device can be acquired by a communication function in the moving body or in the navigation apparatus equipped in the moving body.

Furthermore, from the moving body or the navigation apparatus equipped in the moving body, the drive history information may, for example, be recorded in a record medium and outputted to the outside, and a recommended drive pattern may be generated in the recommended-drive-pattern generation device mounted in external equipment. Additionally, from the moving body or the navigation apparatus equipped in the moving body, the drive history information may, for example, be outputted to the outside by a communication function in the smart phone, for example, and a recommended drive pattern may be generated in the recommended-drive-pattern generation device mounted in external equipment.

It is to be noted that in the present invention, it is possible within a scope of the present invention to freely combine each of the embodiments, modify an arbitrary constitutional element of each of the embodiments, or omit an arbitrary constitutional element in each of the embodiments.

Although the present invention has been described in detail, the above descriptions are illustrative in every aspect and do not restrict the present invention. It is understood that countless numbers of modified examples, not shown, can be conceived without deviating from the scope of the present invention.

EXPLANATION OF REFERENCE NUMERALS 1 recommended-drive-pattern generation device; 2 recommended-drive-pattern calculator; 3 reference drive pattern generating unit; 4 speed limit point setting unit; 5 recommended-drive-pattern generating unit; 6 map information storage; 7 vehicle information acquiring unit; 8 current position identifying unit; 9 drive history information storage.

The invention claimed is:

1. A recommended-drive-pattern generation device comprising:
   a vehicle information acquiring device that acquires vehicle information through a plurality of sensors;
   a drive history information storage device that stores said vehicle information obtained by said vehicle information acquiring device;
   a processor operating as a recommended drive pattern calculator that performs the functions of:
   generating as a reference drive pattern a drive pattern in a past drive route from a drive history of a moving body;
   setting a speed limit point within said drive route based on at least one of said reference drive pattern and road information of said drive route; and
   generating a recommended drive pattern for said drive route in which said speed limit point is passed at a speed not higher than a speed limit defined by said speed limit point and outputting said recommended drive pattern; and
   when a passage time of said speed limit point in accordance with said recommended drive pattern is earlier than a passage time of said speed limit point in accordance with said reference drive pattern, decreasing a cruising speed of said recommended drive pattern, to adjust said passage time of said speed limit point so as to be the same as or later than said passage time of said reference drive pattern.

2. The recommended-drive-pattern generation device according to claim 1, wherein said speed limit defined by said speed limit point is a passage speed at said speed limit point determined by a shape of said drive route.

3. The recommended-drive-pattern generation device according to claim 1, wherein said cruising speed of said recommended drive pattern is set based on said reference drive pattern in each section of said drive route divided by said speed limit point.

4. The recommended-drive-pattern generation device according to claim 1, wherein said cruising speed of said recommended drive pattern is set based on road information of said drive route in each section of said drive route divided by said speed limit point.

5. The recommended-drive-pattern generation device according to claim 1, wherein said acceleration or deceleration of said recommended drive pattern is set based on said reference drive pattern in each section of said drive route divided by said speed limit point.

6. The recommended-drive-pattern generation device according to claim 1, wherein acceleration or deceleration of said recommended drive pattern is set based on a slope of said drive route in each section of said drive route divided by said speed limit point.

7. The recommended-drive-pattern generation device according to claim 1, wherein said recommended-drive-pattern generating unit sets acceleration or deceleration of said recommended drive pattern with a predetermined fixed value in each section of said drive route divided by said speed limit point.

8. The recommended-drive-pattern generation device according to claim 1, wherein said recommended-drive pattern is output to a communication device.

9. A recommended-drive-pattern generation method comprising the steps of:
   acquiring, through a plurality of sensors, vehicle information;
   storing, in a storage device, said vehicle information;
   generating, by a processor operating as a drive pattern calculator, as a reference drive pattern a drive pattern in a past drive route from a drive history of a moving body;
   setting, by a processor operating as a drive pattern calculator, a speed limit point within said drive route based on at least one of said reference drive pattern and road information of said drive route; and
   generating, by a processor operating as a drive pattern calculator, a recommended drive pattern for said drive route in which said speed limit point is passed at a speed not higher than a speed limit defined by said speed limit point and outputting said recommended drive pattern; and
   when a passage time of said speed limit point in accordance with said recommended drive pattern is earlier than a passage time of said speed limit point in accordance with said reference drive pattern, decreasing a cruising speed of said recommended drive pattern, to adjust said passage time of said speed limit point so as to be the same as or later than said passage time of said reference drive pattern.

10. The recommended-drive-pattern generation method according to claim 9, wherein said speed limit defined by said speed limit point is a passage speed at said speed limit point determined by a shape of said drive route.

11. The recommended-drive-pattern generation method according to claim 9, wherein a cruising speed of said recommended drive pattern is set based on said reference drive pattern in each section of said drive route divided by said speed limit point.

12. The recommended-drive-pattern generation method according to claim 9, wherein a cruising speed of said recommended drive pattern is set based on road information of said drive route in each section of said drive route divided by said speed limit point.

13. The recommended-drive-pattern generation method according to claim 9, wherein acceleration or deceleration of said recommended drive pattern is set based on said reference drive pattern in each section of said drive route divided by said speed limit point.

14. The recommended-drive-pattern generation method according to claim 9, wherein acceleration or deceleration of said recommended drive pattern is set based on a slope of said drive route in each section of said drive route divided by said speed limit point.

15. The recommended-drive-pattern generation method according to claim 9, wherein acceleration or deceleration of said recommended drive pattern is set with a predetermined fixed value in each section of said drive route divided by said speed limit point.

16. The recommended-drive-pattern generation method according to claim 9, wherein said recommended-drive pattern is output to a communication device.

* * * * *